(12) United States Patent
Nguyen et al.

(10) Patent No.: US 6,272,328 B1
(45) Date of Patent: Aug. 7, 2001

(54) SYSTEM FOR PROVIDING AUDIO SIGNALS FROM AN AUXILIARY AUDIO SOURCE TO A RADIO RECEIVER VIA A DC POWER LINE

(75) Inventors: Anh Nguyen, Boynton Beach; Argyrios A. Chatzipetros, Lake Worth, both of FL (US)

(73) Assignee: XM Satellite Radio Inc., Washington, DC (US)

( * ) Notice: Subject to any disclaimer, the term of this patent is extended or adjusted under 35 U.S.C. 154(b) by 0 days.

(21) Appl. No.: 09/310,352

(22) Filed: May 12, 1999

(51) Int. Cl.[7] .............................. H04B 1/06; H04B 7/00; H04B 7/14; H04B 1/00; H04M 9/00
(52) U.S. Cl. .................. 455/277.1; 455/402; 455/270; 455/34.4; 455/345; 455/66; 455/42; 455/20
(58) Field of Search .................... 455/402, 270, 455/269, 272, 277.1, 344, 345, 66, 74, 88, 346, 43, 20, 142, 557, 556, 426; 379/110.01, 430, 421; 381/86, 123

(56) References Cited

U.S. PATENT DOCUMENTS

| | | | |
|---|---|---|---|
| 3,369,078 | 2/1968 | Stradley | 381/2 |
| 3,400,221 | 9/1968 | Wolters | 455/6.3 |
| 3,665,310 | 5/1972 | Tweed, Jr. | 325/21 |
| 3,751,601 | 8/1973 | Wally | 179/100.11 |
| 4,712,250 | 12/1987 | Michels et al. | 455/20 |
| 5,235,568 | 8/1993 | Masaru | 369/2 |
| 5,319,716 | 6/1994 | McGreevy | 381/79 |
| 5,448,757 | 9/1995 | Hirata | 455/43 |
| 5,794,138 | 8/1998 | Briskman | 455/344 |
| 5,797,088 | 8/1998 | Stamegna | 455/345 |
| 5,867,794 | * 2/1999 | Hayes et al. | 455/557 |
| 5,903,850 | * 2/1999 | Huttunen et al. | 455/557 |

FOREIGN PATENT DOCUMENTS 0949771 10/1999 (EP) .............................. H04H/1/00

* cited by examiner

Primary Examiner—Dwayne Bost
Assistant Examiner—Raymond Persino
(74) Attorney, Agent, or Firm—Roylance, Abrams, Berdo & Goodman

(57) ABSTRACT

A system is provided for detecting the presence of an FM-modulated audio signal from an auxiliary source, and operating a switch to provide that audio signal to a tuner in lieu of the radio frequency signal received at the tuner antenna. The tuner can be a vehicle tuner. The system also comprises a modulator unit for modulating the audio signal and an output plug for insertion into a cigarette lighter receptacle or power receptacle of a vehicle. A radio frequency transmission line, such as a coaxial cable, connects the cigarette lighter receptacle or power receptacle to the vehicle battery and to an antenna switch unit and transports both DC power and the FM-modulated audio signal. The antenna switch unit comprises switched inputs for the vehicle antenna and the output from the modulator unit, and a radio frequency signal detection device for detecting when the FM-modulated audio signal is present. The antenna switch unit provides the output from the modulator unit to the tuner whenever it is detected.

16 Claims, 4 Drawing Sheets

SYSTEM FOR PROVIDING AUDIO SIGNALS FROM AN AUXILIARY AUDIO SOURCE TO A RADIO RECEIVER VIA A DC POWER LINE

FIELD OF THE INVENTION

The invention relates to a system for providing audio signals from an auxiliary source to a radio receiver, particularly a vehicle radio receiver, using a DC power line such as a line connecting a cigarette lighter plug in a vehicle dashboard to the vehicle battery. The invention further relates to a system for automatically switching the input to a radio receiver from a radio broadcast signal to a signal from the auxiliary source.

BACKGROUND OF THE INVENTION

A number of systems exist which use an existing radio receiver (e.g., an AM and/or FM tuner in a vehicle) for playback of audio signals from an auxiliary source such as a compact disc (CD) player or a tape cassette player. For example, as disclosed in U.S. Pat. No. 4,712,250, to Michels et al, an adapter is provided to connect a portable stereo cassette player to a vehicle radio receiver. The adapter comprises a standard audio plug for receiving a signal from the cassette player. The adapter comprises circuitry (e.g., a tuning capacitor) for modulating the signal onto a weak FM carrier on an unused FM channel. The adapter can be inserted into a cigarette lighter receptacle to couple the FM signal to the radio.

Another system is disclosed in U.S. Pat. No. 5,448,757, to Hirata, in which the output of a CD player is FM-modulated for reception by an FM tuner. A radio frequency for modulating the output of the CD player is selected manually.

The devices disclosed in the two aforementioned patents are both disadvantageous for the same reason, that is, these devices require manual steps to play the audio signals from an auxiliary source on a radio receiver. A need exists for a device which allows an existing radio to automatically play an audio signal from an auxiliary source, instead of standard AM or FM broadcast programming, whenever the auxiliary source is present and operational.

In U.S. Pat. No. 3,751,601, to Wally, a tape playback device is provided for playing an audio signal from a tape cassette through a radio receiver in lieu of FM broadcast programming. A switch is provided for automatically switching between a radio broadcast station and a tape cassette source. The switch is mechanically activated when a tape is inserted into the tape playback device. This device, however, does not directly detect the presence of a signal from the auxiliary source. A need therefore exists for a device which detects when an audio signal from auxiliary source is present to provide the audio signal through a tuner. A need also exists for such a device which does not require activation by a user such as manual tuning or insertion of a tape or cassette into a playback device.

SUMMARY OF THE INVENTION

In accordance with the present invention, a device is provided for detecting the presence of a modulated audio signal from an auxiliary source, and for automatically operating a switch to provide the modulated audio signal to a tuner in lieu of the radio frequency signal received at the tuner antenna.

In accordance with an aspect of the present invention, the audio signal is frequency modulated on a channel in the operating radio frequency band of the tuner.

In accordance with another aspect of the present invention, the tuner is a vehicle tuner. The device comprises a modulator device having an output plug that is inserted into a cigarette lighter receptacle or power receptacle in the dashboard of the vehicle. An antenna switch unit is also provided and comprises a first input for connection to the vehicle antenna and an output for connection to the tuner antenna input. The antenna switch unit comprises a second input for receiving the output from the modulator device and a radio frequency signal detection device for detecting when a signal is provided to the second input. The antenna switch unit includes a switch connected to the first and second inputs to provide the signal at one of the inputs to the output. The antenna switch unit is therefore operable to provide the output from the modulator device to the tuner whenever the presence of a signal from the modulator device is detected.

In accordance with yet another aspect of the present invention, the cigarette lighter receptacle or power receptacle is connected to the antenna switch device via a radio frequency conductor such as a coaxial cable. The coaxial cable has two concentric conductors connected, respectively, to the positive and negative terminals of the cigarette lighter or power receptacle and to the vehicle battery or other DC power source. Thus, both DC power and modulated signals from an auxiliary source are provided to the antenna switch unit via a single conductor connected between the cigarette lighter or power receptacle in the dashboard of the vehicle, the vehicle battery and the antenna switch unit. The antenna switch unit allows the modulated signals to be on any frequency without concern for interference by nearby broadcast stations.

BRIEF DESCRIPTION OF DRAWINGS

The various aspects, advantages and novel features of the present invention will be more readily comprehended from the following detailed description when read in conjunction with the appended drawings, in which.

Throughout the drawing figures, like reference numerals will be understood to refer to like parts and components.

DETAILED DESCRIPTION OF THE PREFERRED EMBODIMENTS

Figure 1:
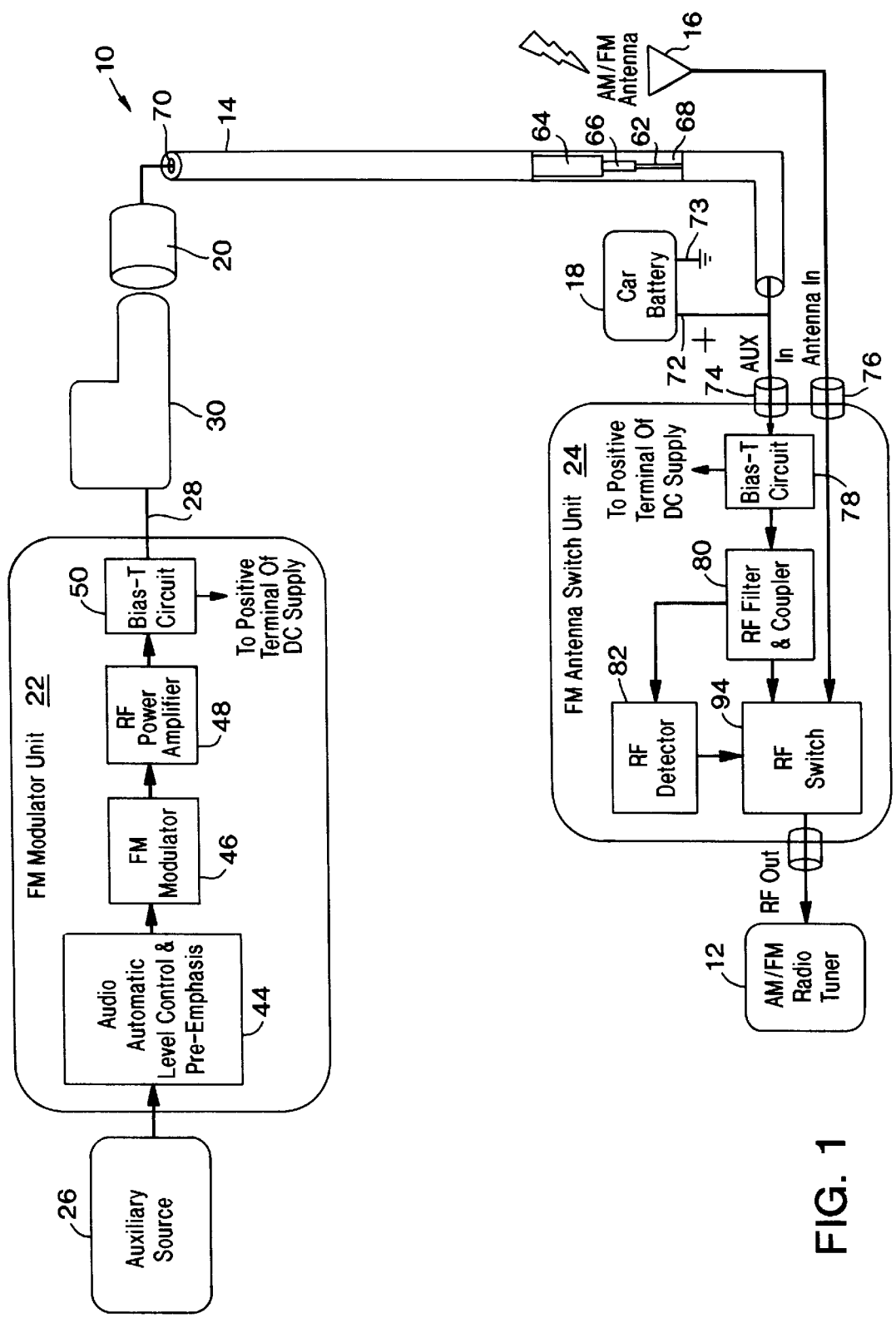
FIG. 1 is a block diagram of a system in accordance with an embodiment of the present invention for providing audio signals from an auxiliary source to a radio tuner via a DC power line.

With reference to FIG. 1, a system 10 for transmitting audio signals from an auxiliary source to a radio receiver (e.g., an AM/FM tuner) 12 via a direct current (DC) power line 14 in accordance with the present invention is illustrated. The radio receiver 12 is preferably the existing tuner in a vehicle. The tuner is connected to an antenna 16 for receiving, for example, AM and/or FM radio broadcasts. The vehicle also comprises a battery 18 and a cigarette lighter receptacle 20 connected to the battery 18.

With continued reference FIG. 1, the system 10 comprises a modulator unit 22 and an antenna switch unit 24. The system 10 allows an audio signal from an auxiliary audio source 26 to be modulated into the operational RF band of the tuner 12 for transmission thereto on the DC power line 14, as described below. The tuner 12 is preferably a conventional amplitude modulation/frequency modulation (AM/FM) radio receiver. It is to be understood that the tuner 12 and the system 10 can be configured to operate at radio frequencies other than the AM and FM radio broadcast bands.

The auxiliary source 26 can be an Sband satellite broadcast receiver, for example, for receiving a satellite digital audio radio service (SDARS), a CD player, or a tape cassette player, among other sources. The satellite broadcast receiver can also be operated in other RF bands and can have, for example, an L-band or UHF front end for use with direct audio broadcast (DAB) systems in different countries. The satellite broadcast receiver downconverts a received broadcast signal to a baseband signal or to an intermediate frequency (F) signal. The satellite receiver is described in more detail below in connection with FIG. 7.

Figure 2:
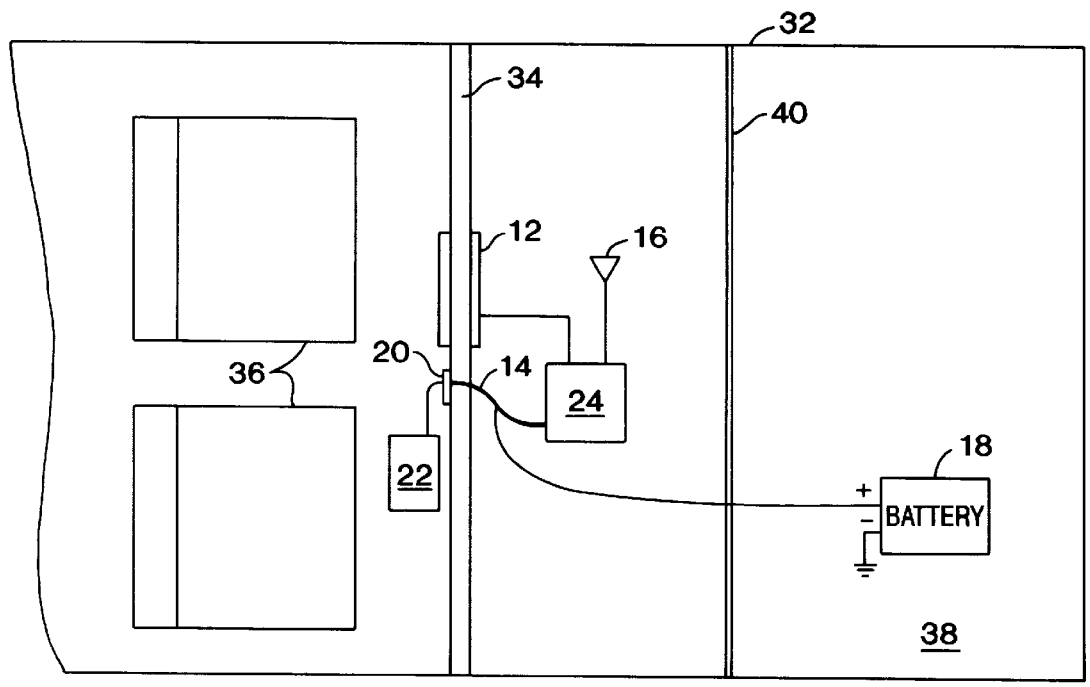
FIG. 2 illustrates an exemplary installation of the system depicted in FIG. 1 in a vehicle.

The audio signal from the auxiliary source 26 is provided to the modulator unit. 22. With reference to FIGS. 1 and 2, the modulator unit 22 is preferably installed internally or externally with respect to the dashboard 34 of the user's vehicle 32 to facilitate the connection of the auxiliary source 26 to the modulator unit 22. The modulator unit 22 has an audio input for the input audio signal from the auxiliary source 26 and an output line 28 having a cigarette lighter plug 30 connected at the end thereof. Accordingly, the modulator unit 22 can be electrically connected to the cigarette lighter receptacle or power receptacle 20 of the vehicle. Depending on the length of the output line 28, the modulator unit 22 can be mounted below the dashboard, under a vehicle seat 36 or in the dashboard, or can simply be placed on the seat or floor of the vehicle. The antenna switch unit 24 is preferably disposed behind the dashboard 34 (e.g., in the engine compartment 38 of the vehicle or between the dashboard 34 and the firewall 40 separating the engine and passenger compartments of the vehicle).

Figure 6:
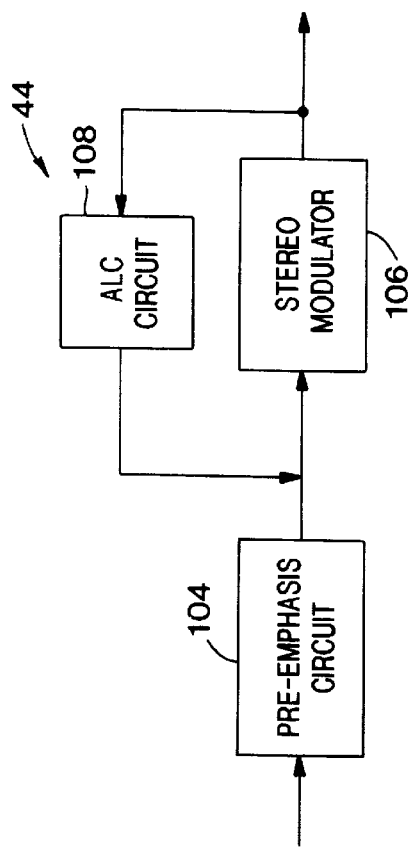
FIG. 6 is a block diagram of an exemplary level control and de-emphasis circuit for use in the modulator unit depicted in FIG. 1.

With reference to FIG. 1, the modulator unit 22 comprises a level control and pre-emphasis circuit 44, which is described below in connection with FIG. 6. The level control and pre-emphasis circuit provides a composite stereo signal to an RF modulator 46. The RF modulator frequency modulates the composite stereo signal to a frequency within the operating RF band of the tuner (i.e., from 87.7 megahertz (MHz) to 108 MHz). As described below, the antenna switch unit 24 detects the presence of the output of the modulator unit 22 and operates a switching device to provide the signal from the modulator unit 22 to the tuner 12 in lieu of a radio broadcast received by the antenna 16. Thus, no interference occurs as between the antenna 16 and the modulator unit 22. The FM modulator 46 is preferably operable to modulate the audio signal from the auxiliary source 26 to a selected channel such as 88.5 MHz, for example. Thus, a user can set a programmable channel selection button on the tuner 12 for tuning to 88.5 MHz to listen to a satellite broadcast. In addition, the FM modulator 46 can be operable to modulate the audio signal from the auxiliary source to one of a plurality of selected RF channels. Accordingly, one of these channels is selected when the system 10 is installed in a vehicle. The selected channel preferably has the lowest noise level in the geographic area where the vehicle is most frequently driven. A programmable channel selection button on the tuner 12 can then be set to the selected channel.

Figure 3:
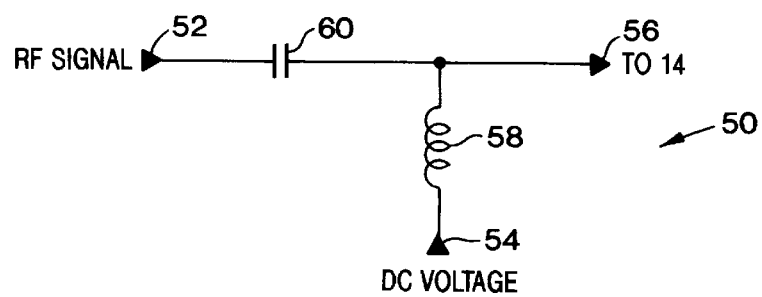
FIG. 3 is a schematic diagram of an exemplary bias-T circuit for use in the modulator unit depicted in FIG. 1.

The RF signal (e.g., an FM signal) at the output of the RF modulator 46 is amplified by the RF power amplifier 48 and is then provided to the output of the modulator unit 22 (i.e., to the cigarette lighter plug (CLP) 30) via a bias-T circuit 50. An exemplary bias-T circuit is depicted in FIG. 3. The bias-T circuit 50 preferably comprises three terminals 52, 54 and 56. A first terminal 52 is connected to the RF amplifier to provide RF-modulated signals from the auxiliary source 26 to the CLP 30 via a second terminal 56. A third terminal 54 is connected to the positive terminal of the battery. Modulator unit components requiring a DC voltage for power can be connected across the terminals 56 and 54. The 12 volts that is typically supplied by a conventional car battery 18 can be reduced to a lower voltage via a voltage divider circuit. The branch of the bias-T circuit connected to terminal 54 is provided with an RF choke 58, which conducts DC power from the battery 18 but presents a high impedance to the RF signal from terminal 52. Accordingly, a DC voltage can be provided via the DC power line 14 to supply power to various components of the modulator unit 22. The branch of the bias-T circuit connected to terminal 56 is provided with a capacitor 60, which conducts the RF signal from terminal 52 but not DC power from terminal 54. Thus, the bias-T circuit allows power to be provided to the modulator unit 22 via the DC line 14, and the RF-modulated signal from the auxiliary source 26 to be provided to the DC power line 14.

As stated previously, the cigarette lighter receptacle or power receptacle 20, into which the CLP 30 is inserted, is connected to DC power line 14. The DC power line 14 is preferably an RF transmission line such as a coaxial cable. As shown in FIG. 1, the coaxial cable is of the conventional type, having an inner conductor 62 that is surrounded along its entire length by a woven outer conductor 64. A low-loss insulative sleeve 66 is provided between the conductors 62 and 64. An insulating jacket 68 surrounds the outer conductor 64. The two conductors 62 and 64 are connected, respectively, to the positive and negative terminals of a DC power source such as the car battery 18 and corresponding terminals of the cigarette lighter receptacle 20. For example, one of the conductors 64 is connected to ground. Conductor 62 can carry a positive voltage from the car battery 18 and an REF signal. The CLP 30 is connected to the postive conductor 64 via the cigarette lighter receptacle 20 to provide a voltage from the car battery 18 to the second terminal 56 of the bias-T circuit 50. The bias-T circuit 50 provides the RF-modulated signal from the amplifier 48 to the positive terminal 70 of the CLP 30, for example, and therefore to the corresponding conductor 62 of the coaxial cable 14. In the illustrated embodiment, the conductor 62 carrying the RF-modulated signal from the auxiliary source 26 is the conductor that is also connected to the positive terminal 72 of the car battery 18. The other terminal 73 of the battery can be connected to ground, for example, in the same manner as the outer conductor 64 of the coaxial cable. It is to be understood that the other coaxial cable conductor 64 can be used to transport the RF-modulated signal instead of the conductor 62. In addition, circuit arrangements other than the bias-T described above can be used. In any event, the coaxial cable 14 supplies DC power to the modulator unit 22 and transports the RF-modulated signal from the auxiliary source 26 to the tuner 12.

Figure 4:
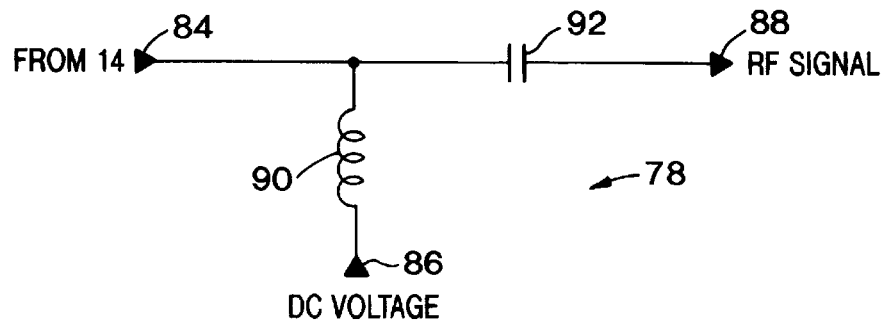
FIG. 4 is a schematic diagram of an exemplary bias-T circuit for use in the antenna switch unit depicted in FIG. 1.

With reference to FIG. 1, the antenna switch unit 24 has a first input or auxiliary source input 74 and a second input 76 connected to the antenna 16. The antenna switch unit 24 also comprises a bias-T circuit 78 for providing the RF-modulated signal to an RF filter and coupler circuit 80, as well as for providing a voltage from the car battery 18 to the antenna switch unit 24. The RF filter and coupler circuit 80 is operable to reject unwanted harmonics or spurious signals that may have been introduced into the RF-modulated signal by virtue of its transport from the modulator unit 22 on the coaxial cable 14 or from engine noise. The RF filter and coupler circuit 80 provides the filtered, RF-modulated signal to an RF detector 82. Referring to FIG. 4, the bias-T circuit 78 has three terminals 84, 86 and 88, and operates in a reverse manner with respect to the bias-T circuit 50 described above. A signal on the DC power and RF conductor 14 is provided to the terminal 84. The branch of the bias-T circuit connected to the terminal 86 comprises an RF choke 90 which operates as a high impedance with respect to the RF-modulated signal transmitted on the DC power line 14 from the modulator unit 22. The terminal 86 can be connected to the positive terminal of the battery. Components of the FM antenna switch unit 24 requiring a DC power source can be connected across the terminals 84 and 86 to receive power from the battery 18. The bias-T circuit 78 also comprises a capacitor 92 in the branch thereof that is connected to the terminal 88. The capacitor allows the RF-modulated signal to pass through to the RF filter and coupler circuit 80 but not the DC voltage on the DC power line 14.

Figure 5:
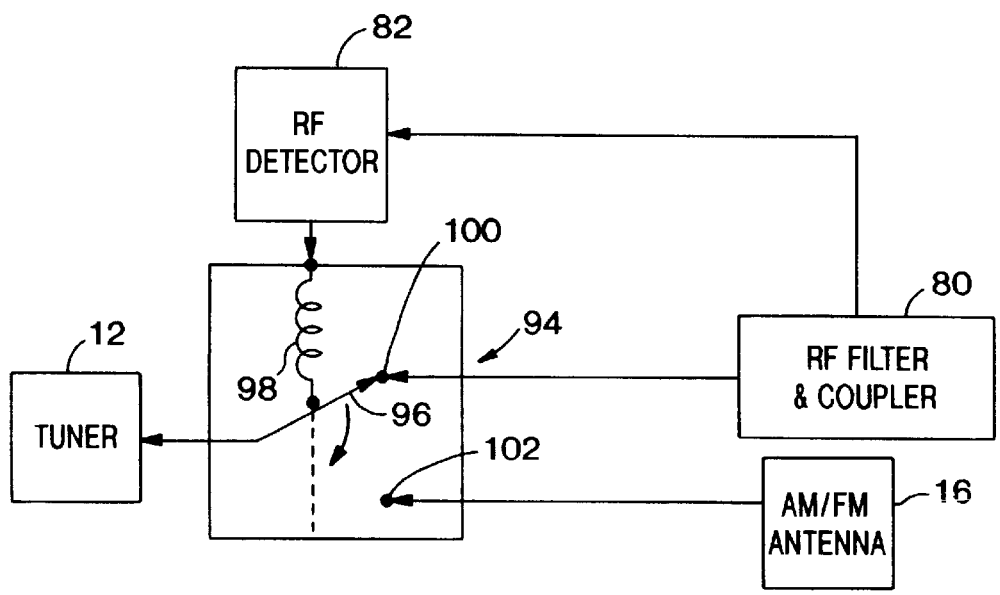
FIG. 5 is a schematic diagram of an exemplary switching component for use in the antenna switch unit depicted in FIG. 1.

The RF detector 82 in FIG. 1 can detect the presence of an RF-modulated signal by a number of different methods. The RF detector 82 preferably monitors the output of the RF filter and coupler circuit 80 for a selected RMS voltage level (e.g., approximately 20 millivolts) corresponding to the RE signal. The level signifies the presence of an RF-modulated signal from the modulator unit 22 since the bias-T circuit does not pass DC power from the battery 18 through the terminal 88 connected to the auxiliary 74, as shown in FIGS. 1 and 4. When the selected voltage is detected, the RF detector 82 generates an output signal to operate an RF switch 94 to provide the RF-modulated signal from the auxiliary source 26, and not a broadcast signal received via the antenna 16, to the tuner 12. The RF switch, for example, can be a relay 96 having a coil 98 that is energized by an output from the RF detector 82, as shown in FIG. 5. The RF switch 94 has a first contact 100 connected to the RF filter and coupler circuit 80 and a second contact 102 connected to the antenna 16. The RF switch 94 is in the closed position with respect to the first contact 100, as long as the RF detector 82 senses that an RF-modulated signal is being generated by the modulator unit 22. When no such RF-modulated signal is detected, the RF detector 82 de-energizes the coil 98 in the RF switch. Accordingly, the RF switch 94 switches to the second contact 102 to provide received signals from the antenna 16 to the tuner 12. The RF switch 94 is preferably automatically operated by the RF detector 82, although a manually operated switch can be provided. In addition, the automatic RF switch 94 can be implemented as an electrical, electronic, electromechanical or mechanical switch.

In FM broadcasting, high audio frequencies are emphasized to improve the signal-to-noise ratio (SNR). Thus, a conventional FM tuner such as the tuner 12 FIG. 1) is provided with a de-emphasis circuit for obtaining a flat frequency characteristic. Accordingly, the level of the output signals from the auxiliary source 26 are adjusted via the automatic level control and pre-emphasis circuit 44 (FIG. 1) to prevent the attenuation of high audio frequencies by the de-emphasis circuit in the tuner 12. Such processing is described in U.S. Pat. No. 5,448,757, issued to Hirata on Sep. 5, 1995, and is incorporated herein by reference. With reference to FIG. 6, the left and right channels in the audio signals recovered by an auxiliary source 26 such as a satellite receiver, for example, are processed by a stereo modulator 106 and an automatic level control (ALC) circuit 108 connected to the output of the pre-emphasis circuit 104. The stereo modulator 106 modulates the audio signals from the satellite receiver to a composite signal. The ALC circuit 108 controls the input to the stereo modulator 106 to reduce distortion.

Figure 7:
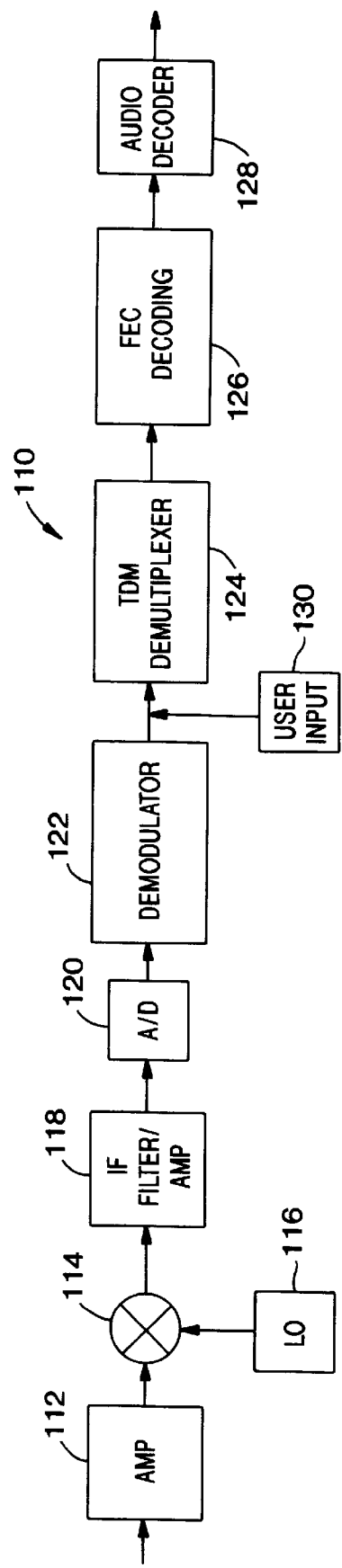
FIG. 7 is a block diagram of an exemplary satellite receiver for use with the system depicted in FIG. 1.

As stated previously, the auxiliary source 26 can be a satellite receiver such as an S-band satellite receiver. An exemplary satellite receiver 110 is depicted in FIG. 7. The S-band signals are amplified by amplifier 112 prior to downconversion to an IF via a mixer 114 and a local oscillator (LO) 116. The recovered IF signal is then processed via an IF filter and amplifier 118 prior to obtaining the digital baseband information transmitted via satellite. For example, the recovered IF signal can be converted to a digital representation thereof using an analog-to-digital converter (ADC) 120 prior to phase shift keying (PSK) demodulation by a demodulator 122 if the baseband signal as PSK-modulated at the broadcast station. The satellite broadcast signals can be time division multiplexed (IDM) signals and therefore comprise information from a number of broadcast programs, as well as having TDM data representing the left and right stereo channels corresponding to the same broadcast program. Accordingly, a TDM demultiplexer 124 is provided in the satellite receiver 110 to recover the information from the TDM broadcast channels. The recovered information corresponds to the satellite broadcast program selected by the user, as indicated at 130. The recovered information can be processed at the broadcast stations to provide forward error correction (FEC) coding which is decoded using the FEC 126 decoder at the receiver 110. Finally, the recovered baseband data can be converted into analog audio signals using an audio decoder 128 such as an MPEG decoder.

In accordance with an aspect of the present invention, the system 10 (FIG. 1) can be implemented to convert the radio tuner 12 into a dual-mode receiver in a satellite broadcast system in which measures such as time, space and frequency diversity have been taken to reduce the effects of multipath on satellite signal reception at the vehicle. Space and time diversity are useful when a mobile satellite receiver is traveling in a suburban or rural area where line of sight blockage with respect to the antenna 12 and the satellite occurs due to bridges, trees and low buildings. On the other hand, terrestrial re-radiation of satellite signals is useful in areas where tall buildings are located such as central city and metropolitan areas.

Although the present invention has been described with reference to a preferred embodiment thereof, it will be understood that the invention is not limited to the details thereof. Various modifications and substitutions have been suggested in the foregoing description, and others will occur to those of ordinary skill in the art. All such substitutions are intended to be embraced within the scope of the invention as defined in the appended claims.

What is claimed is:

1. An apparatus for providing audio signals from an auxiliary source to a radio receiver, said radio receiver receiving a broadcast signal via an antenna, the apparatus comprising:

a modulator unit for modulating an audio signal generated by said auxiliary source onto a radio frequency to which said radio receiver can be tuned;

an antenna switch unit having an output connected to said radio receiver, a first input connected to said antenna and a second input; and a conductor connected at one end thereof to an output of said modulator unit and connected at the other end thereof to said second input, said antenna switch unit comprising a switching device for selectively switching between said first input and said second input for providing the corresponding one of said broadcast signal and said modulated audio signal to said output, and a radio frequency detection and switching control device for controlling said switch device to automatically provide said modulated audio signal to said output in response to said modulated audio signal being provided to said antenna switch unit.

2. An apparatus as claimed in claim 1, wherein said conductor comprises a coaxial cable.

3. An apparatus as claimed in claim 1, wherein said conductor electrically connects a cigarette lighter receptacle or power receptacle to a battery.

4. An apparatus as claimed in claim 3, wherein said modulator unit comprises an output plug that is removably connected to said cigarette lighter receptacle or power receptacle for providing said audio signal modulated as a radio frequency signal to said conductor.

5. An apparatus as claimed in claim 3, wherein said conductor comprises a coaxial cable comprising an inner conductor and an outer conductor, said inner conductor and said outer conductor being connected to first and second terminals, respectively, of each of said battery and said cigarette lighter receptacle.

6. An apparatus as claimed in claim 5, wherein said coaxial cable conducts both said audio signal as the radio frequency signal generated by said modulator unit, and a DC power signal generated by said battery, and at least one of said modulator unit and said antenna switch unit comprises a bias-T circuit, said bias-T circuit comprising a first branch connected to said coaxial cable, a second branch connected to said at least one of said modulator unit and said antenna switch unit, and a third branch connected to a DC conductor, said second branch being configured to operate as a high impedance with respect to said DC power signal and to pass said radio frequency signal, and said third branch being configured to pass said DC power signal but not said radio frequency signal.

7. An apparatus as claimed in claim 6, wherein said second branch comprises a capacitor.

8. An apparatus as claimed in claim 6, wherein said third branch comprises one of a radio frequency choke and a radio frequency high impedance circuit.

9. A method of providing an audio signal from an auxiliary source to a radio receiver for playback in lieu of a broadcast signal received at said radio receiver comprising the steps of: modulating said audio signal, onto a radio frequency to which said radio receiver can be tuned, for transmission via a conductor; providing said modulated audio signal to an antenna switch unit via said conductor, said antenna switch unit also being connected to an antenna for receiving said broadcast signal; detecting when said modulated audio signal is being provided to said antenna switch unit; and operating a switch to provide said modulated audio signal to said radio receiver in response to said modulated audio signal being detected at said antenna switch unit and to provide said broadcast signal to said radio receiver when said modulated audio signal is not detected.

10. A method as claimed in claim 9, wherein said detecting step comprises the step of detecting when said modulated audio signal provided to said antenna switch unit exceeds a predetermined voltage level, and said operating step comprises the step of providing said radio receiver said broadcast signal when said modulated audio signal is below said predetermined voltage level.

11. A method as claimed in claim 9, wherein said modulating step is performed using a modulator unit located remotely with respect to said antenna switch unit, and further comprising the steps of:

extending an electrical line having a first conductor and a second conductor between said modulating unit and said antenna switch unit;

connecting said first conductor and said second conductor, respectively, to a first terminal of a battery for providing a voltage and a grounded second terminal of said battery; and transmitting a DC power signal from said battery and said audio signal modulated as a radio frequency signal via said modulator unit on said electrical line.

12. A method as claimed in claim 11, further comprising the steps of:

connecting one end of said electrical line to a cigarette lighter receptacle or power receptacle in a vehicle; and providing said modulator unit with a plug configured to be electrically connected to said cigarette lighter receptacle or power receptacle.

13. A method as claimed in claim 11, further comprising the step of providing power to said modulator unit and said antenna switch unit from said battery via said electrical line.

14. A method as claimed in claim 13, wherein said power providing step comprises the step of providing at least one of said modulator unit and said antenna switch unit with a bias-T circuit, said bias-T circuit comprising a first branch connected to said electrical line, a second branch connected to said at least one of said modulator unit and said antenna switch unit, and a third branch connected to a DC conductor, said second branch being configured to operate as a high impedance with respect to said DC power signal and to pass said radio frequency signal, and said third branch being configured to pass said DC power signal but not said radio frequency signal.

15. An apparatus as claimed in claim 14, wherein said second branch comprises a capacitor.

16. An apparatus as claimed in claim 14, wherein said third branch comprises one of a radio frequency choke and a radio frequency high impedance circuit.

* * * * *